much is mounted above the platform to correct an unbalance condition of the blade. The drive mechanism has a pair of depending arms which are adjustably mounted to cooperate with a pair of slidably mounted weights in the blade. Upon actuation of the drive mechanism the arms cause the weights to move longitudinally along the blade so as to balance the blade.

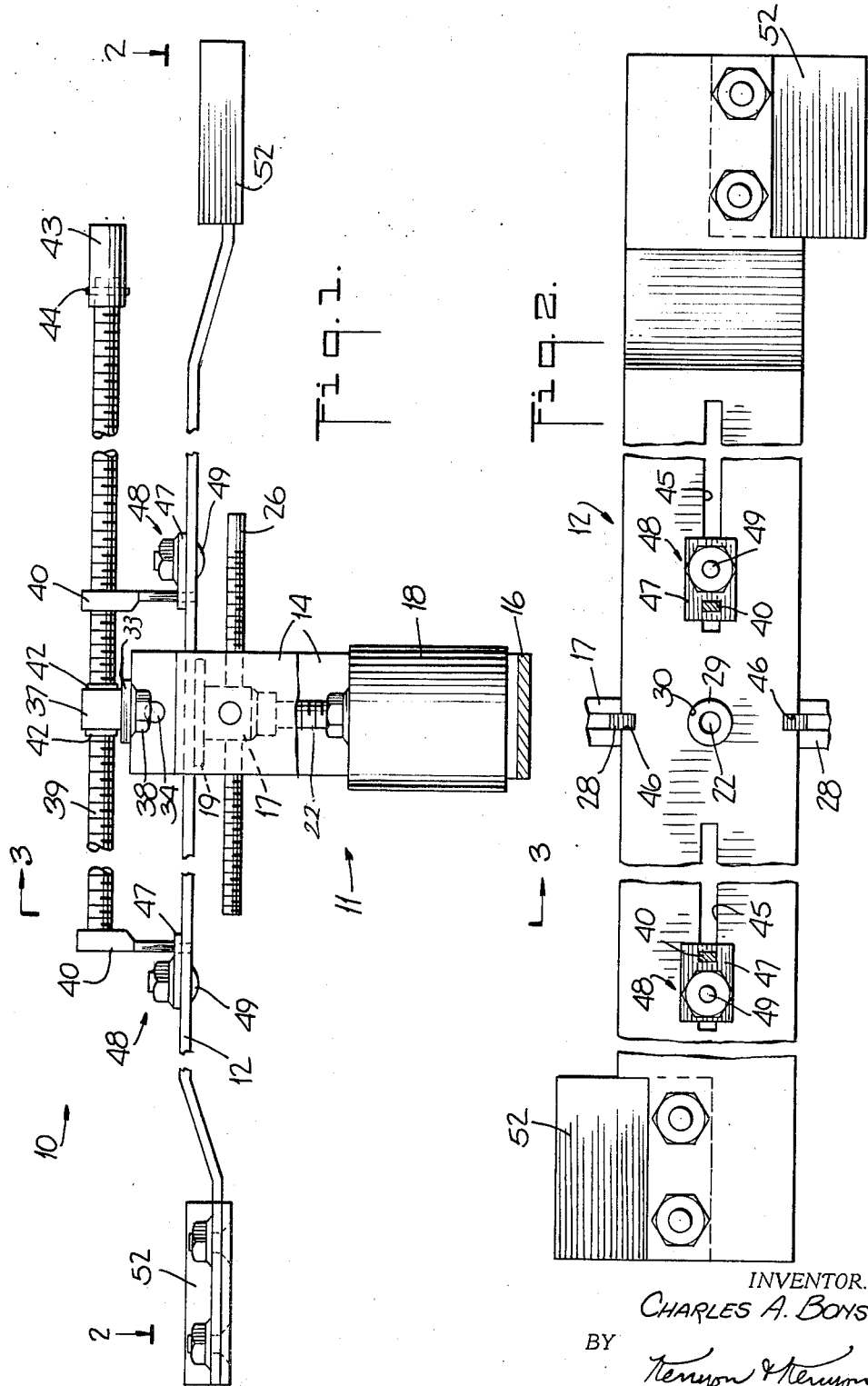

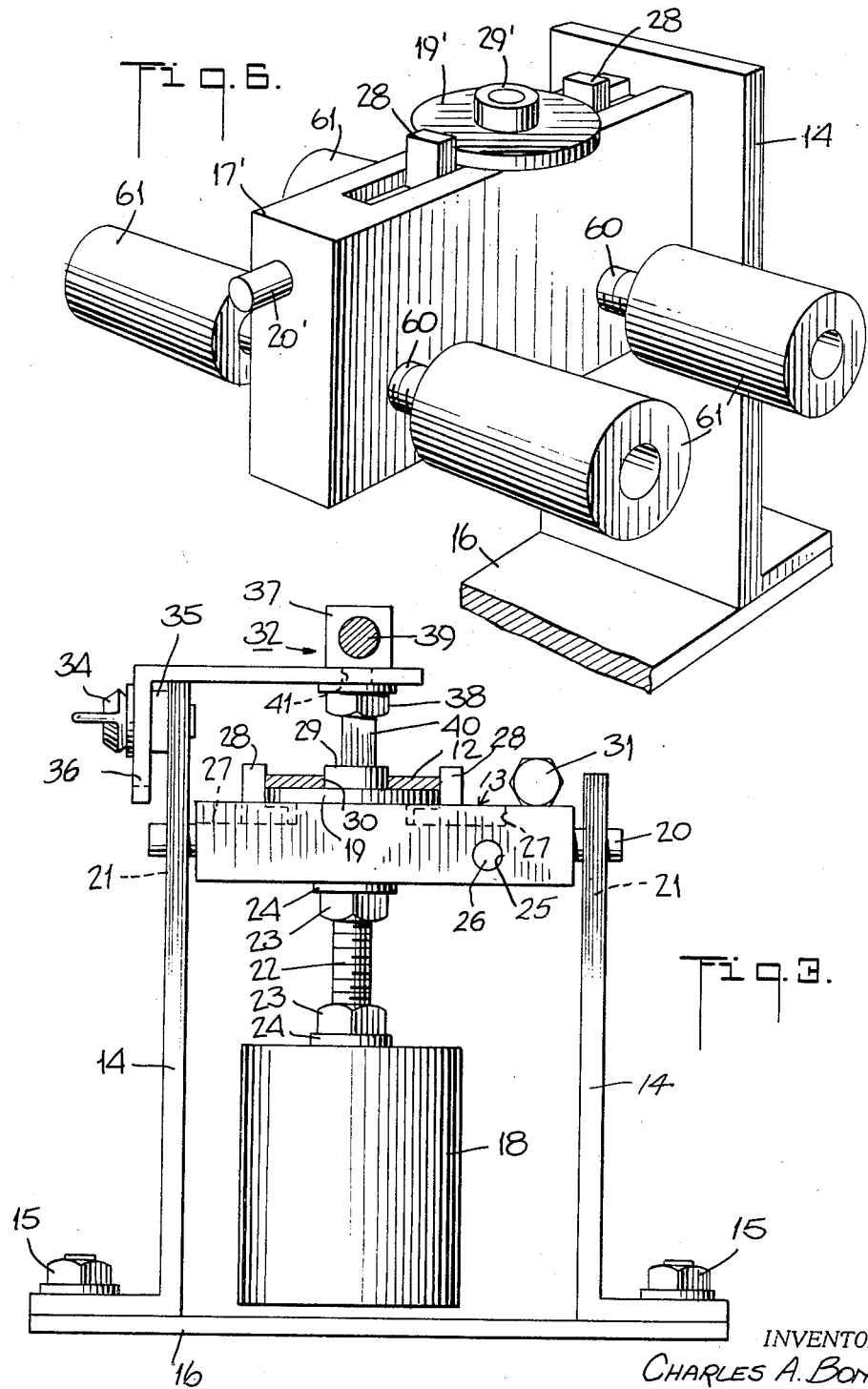

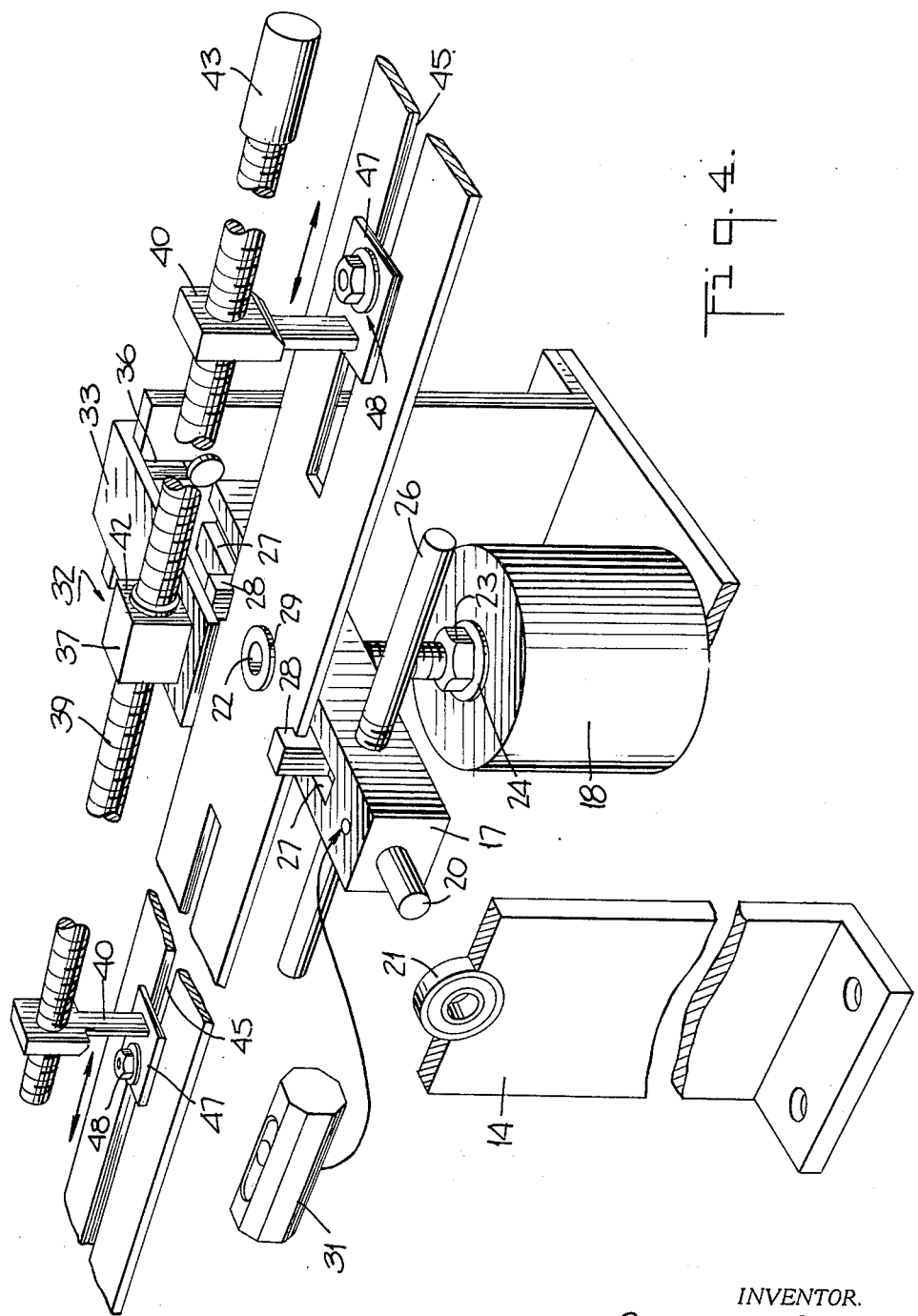

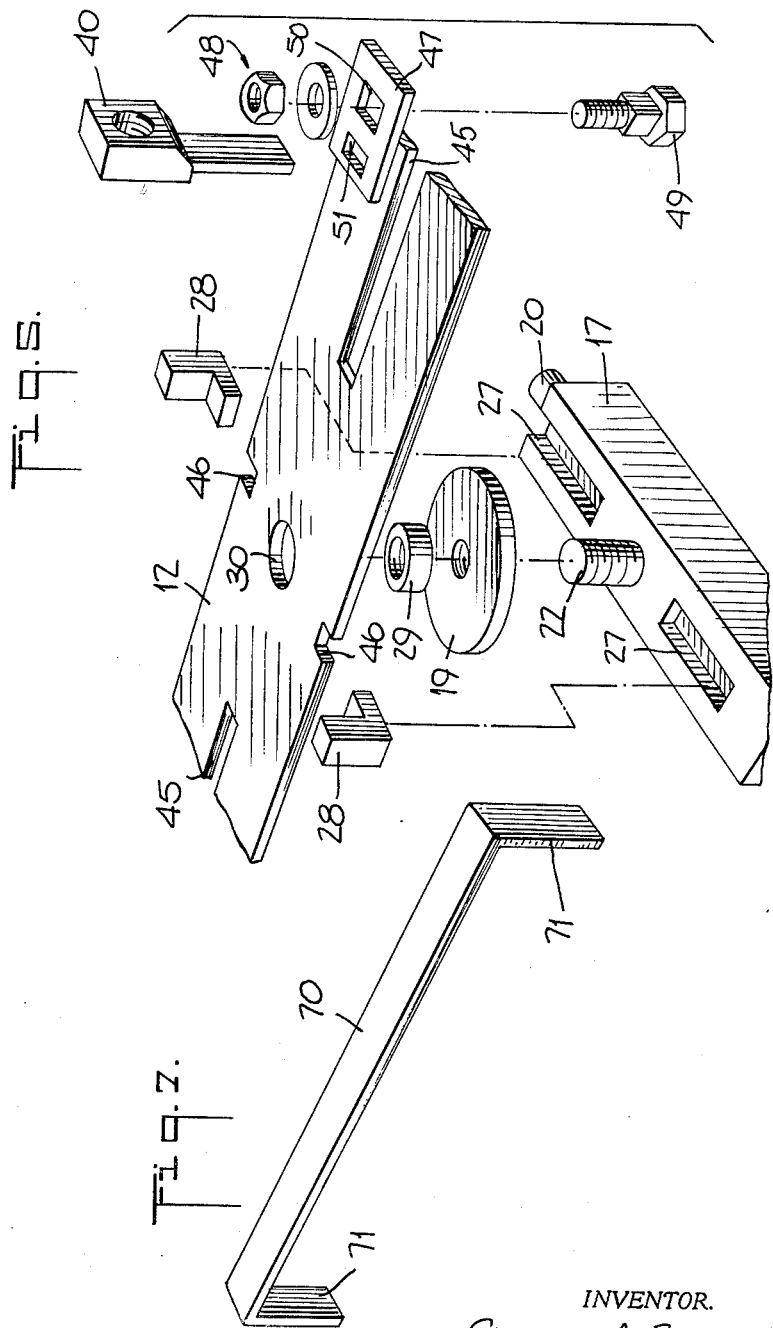

United States Patent Office 3,488,998
Patented Jan. 13, 1970

3,488,998
BALANCING DEVICE
Charles A. Bonsor, 14 New Highway 50,
Ridge Manor, Fla. 33525
Filed Aug. 24, 1967, Ser. No. 663,117
Int. Cl. G01m 1/02
U.S. Cl. 73—66
19 Claims

ABSTRACT OF THE DISCLOSURE

The balancing system has a pivotal axle and blade platform upon which the slotted blade is freely supported. The driving mechanism has a pair of depending arms which mesh with the slotted weights movably mounted on the blade so that the drive mechanism can move the weights along the blade to balance the blade and axle.

This invention relates to a balancing device. More particularly, this invention relates to a lawn mower blade balancing device.

Heretofore, devices have been known for indicating the balance or degree of unbalance of blades such as lawn mower blades. These devices have in general been constructed with pivots or pivotal tables which are sized to receive and mount the blades while permitting pivoting of the tables or blades in the direction of the blade unbalance. Once an unbalance in a blade is detected, the blade is removed from the device and the heavier sides is ground to remove material. However, in order to determine if sufficient material has been removed from the blade, the blade must usually be repositioned on the device and again tested for balance. Frequently, a blade is tested for balance a number of times before a balanced blade is achieved.

These heretofore known devices have generally resulted in the blades losing a substantial amount of material, especially in the cutting edges of the blades, due to the repeated grinding operations needed to bring the blades into balance. In addition, the trial and error techniques with which these devices have been utilized have been time consuming and cumbersome, especially where the devices have been constructed with complex blade mounting assemblies.

Accordingly, it is an object of the invention to balance a blade while in place on a balancing device.

It is another object of the invention to balance a mower blade without removing material from the blade.

It is another object of the invention to integrate a mower blade and a balancing device together in a unitary system of balancing.

It is another object of the invention to substantially reduce the time and effort required to balance a lawn mower blade.

It is another object of the invention to provide a device for balancing mower blades which is acurate and convenient to use.

Briefly, the invention provides a balancing device which is integrated with a mower blade into a unitary balancing system. The balancing device is constructed to cooperate with the mower blade so as not only to detect any unbalance in the blade but also to correct the unbalance. Likewise, the mower blade is constructed so as to cooperate with the balancing device to permit balancing while in place on the balancing device.

The balancing device is provided with a pivotally mounted platform which is suspended in a suitable manner and which is adapted to receive the mower blade of the system in a secure manner such that any unbalance in the blade causes the platform to tilt. In addition, the balancing device is provided with a drive mechanism In one embodiment, the suspended platform is provided with a depending weight which functions as a leverage to maintain the platform in a horizontal balanced condition before mounting of a blade for balancing as well as a threaded horizontal rod which functions to shift the center of gravity of the platform. In addition, the drive mechanism is mounted independently of the platform so that any imbalance in the drive mechanism does not effect the balancing of a blade on the platform. In this embodiment, the drive mechanism is mounted for vertical adjustment so as to be lifted to disengage the depending arms from the weights in the blade when a blade is to be positioned on or removed from the platform.

In another embodiment, the suspended platform is provided with a compound leverage such as two pairs of horizontally extending weights which are adjustable to correct the balance of the platform.

In still another embodiment, the drive mechanism is independent of connection to the balancing device. In this embodiment the drive mechanism constitutes a manually handled bar having a pair of depending arms at the ends for engagement in the movable weights of a blade mounted on a platform as above.

The mower blade of the system is formed with a conventional center aperture as well as pairs of longitudinal and transverse slots. The longitudinal slots each receive a weight in slidably mounted relationship while the transverse slots are sized to cooperate with mating adapters or protuberances on the platform of the balancing device. The weights received in the longitudinal slots are apertured to receive the depending arms of the drive mechanism of the balancing device so as to be moved longitudinally of the blade during a balancing operation.

Before placing a blade on the platform of the above balancing device, the platform is leveled into a horizontal plane. This allows any unbalance which is manufactured into the balancing device to be corrected quickly and easily. Thereafter, a blade is positioned on the platform in alignment with the mating adapters on the platform. The blade is then tested for balance by permitting the platform to tilt freely under the weight of the blade in the direction of the unbalance. Should any unbalance be indicated, the drive mechanism is actuated to shift the movable weights along the blade in unison to correct the unbalance. The weights are brought to stationary positions upon balancing of the blade. The balanced blade is then removed and, if desired, is reversed and repositioned on the platform for a cross check.

These and other objects and advantages of the invention will become more apparent from the following detailed description and appended claims taken in conjunction with the accompanying drawings in which:

FIG. 1 illustrates a front view of one embodiment of a balancing device of the invention with a blade in place;

FIG. 2 illustrates a fragmentary view taken on line 2—2 of FIG. 1 of the blade utilized in the system of the invention;

FIG. 3 illustrates a view taken on line 3—3 of FIG. 2;

FIG. 4 illustrates an exploded view of the balancing device and blade of FIG. 1;

FIG. 5 illustrates a fragmentary exploded view of the adapters and pivotal platform of the balancing device as well as the manner of securing the movable weights in the blade;

FIG. 6 illustrates a perspective view of a modified platform of a balancing device according to the invention; and FIG. 7 illustrates a perspective view of another modified drive mechanism according to the invention.

Referring to FIGS. 1, 3 and 4, the balancing system 10 includes a balancing device 11 which utilizes a lawn mower blade 12. The balancing device 11 has a platform 13 which is pivotally mounted in a pair of L-shaped upstanding brackets 14 secured as by bolts 15 to a mounting platform 16. The platform 13 is formed by an axle 17, depending weight 18 and a blade platform 19. The axle 17 has a pair of axial stub shaft ends 20 which are journalled at opposite ends within suitable bearings 21, such as self-aligning ball bearings, in the brackets 14. The axle 17 also has a threaded bore which extends vertically through the axle on the axis of the stub shafts 20 to receive a threaded rod 22 which is secured in the weight 18, as by threading, so as to fix the weight 18 to the axle 17 in depending relation. In order to retain the rod 22 in the axle 17 and weight 18, a pair of lock nuts 23 are tightened against washers 24 which abut the axle 17 and weight 18. The axle 17 also has a threaded bore 25 (FIG. 3) which extends horizontally through the axle 17 and in which a threaded rod 26 is mounted for adjusting the center of gravity of the platform 13. The blade platform 19 is seated on the top of the axle 17 by being threaded onto the top end of the rod 22 to position the mower blade 12 on the platform 13.

The blade platform 19 is sized to elevate the blade 12 from the axle 17 in order to compensate for any warpage in the blade 12 and to support the blade during a balancing operation. It has been found that a warped blade which is elevated by the blade platform 19 from the axle 17 can be accurately balanced. The blade platform has the dimension of, for example, a diameter of 1⅜ inches and a thickness of ⅛ inch and is utilized with blades of a length up to 30 inches and a width of from 1½ to 2½ inches.

Additionally, the axle 17 has a pair of recesses 27 in the top surface astride the blade platform 19. Each recess 27 has a blade holder 28 which is L-shaped in cross-section slidably mounted therein for securely positioning the blade 12 in an alignment with the axle 17.

In order to facilitate the mounting of the blade 12, an adapter 29 of circular configuration is threaded onto the rod 22 over the blade platform 19. The adapter 29 serves to project through a mating central aperture 30 in the blade 12. The adapter 29 is easily removed from the rod 22 by threading to permit replacement with a like adapter of different size for mating with blades having differently sized central apertures. However, the adapter 29 is not necessary to mount the blade 12 on the blade platform 19 and can be omitted where desired.

In order to determine when the platform 13 is level, a suitable spirit level 31 is mounted on the top surface of the axle 17 at the front of the balancing device 11. The spirit level 31 is aligned perpendicularly with respect to the axle 17 so as to be substantially parallel to the blade 12 mounted on the blade platform 19.

The balancing device 11 also has a drive mechanism 32 mounted above the platform 13 for correcting the unbalance of the blade 12 on the blade platform 19. The drive mechanism 32 is mounted by means of an L-shaped bracket 33 to the bracket 14 at the rear of the balancing device 11. The bracket 33 rests on the bracket 14 and is secured by a suitable threaded bolt 34 such as a wing nut and spacer 35 in spaced relation to the bracket 14. The bracket 33 receives the bolt 34 in an open elongated slot 36 so that the bracket 33 can be lifted off the bracket 14 upon loosening of the bolt 34.

Referring to FIG. 1, the drive mechanism 32 has a guide box 37 secured to the bracket 33 as by a bolt 38, a threaded drive rod 39 which extends through the guide box 37 and a pair of depending arms 40 on the drive rod 39. The bolt 38 passes through an elongated slot 41 in the bracket 33 so that the guide box 37 can be adjusted with respect to the blade platform 19 upon loosening of the bolt 38. The drive rod 39 is provided with an unthreaded portion within the guide box 37 so as to be freely rotatable with respect to the guide box 37. In addition, the drive rod 39 is provided with a pair of annular grooves on each side of the unthreaded portion which receive a pair of clip rings 42 for preventing movement of the drive rod 39 out of the guide box 37. The arms 40 are threaded onto each end of the drive rod 39 so as to be adjusted longitudinally of the drive rod 39 upon relative rotation.

The drive rod 39 is aligned transversely of the axle 17 between the plane of the blade holders 28 so as to be in alignment over the blade 12. Also the arms 40 extend downwardly into the plane of the blade 12.

In order to rotate the drive rod 39 within the guide box 37, a suitable thimble 43 is fitted as by a lock pin 44 to one or both ends of the drive rod 39.

Referring to FIGS. 1 and 2, the blade 12 has a central aperture 30 which facilitates mounting, for example, on a lawn mower and is also provided with a pair of longitudinal slots 45 and a pair of transverse slots 46. The longitudinal slots 45 are sized to extend along the blade a sufficient distance to permit balancing of the blade. For example, for a 30 inch blade, the slots are about 4⅛ inches in length and extend out about 5½ inches from the center of the blade. A weight 47 is positioned over each longitudinal slot 45 and is secured in slidable relation by a nut and bolt assembly 48. The bolt 49 of the nut and bolt asseembly 48 has a square shank which is received in the slot 45 so as to be restrained against rotation. Each weight 47 has a pair of slots 50, 51, one of which is sized to receive the shank of bolt 49 to prevent rotation of the weight, the other of which is sized to receive a depending arm 40 to permit movement of the weight along the blade 12 as well as oscillation of the blade 12 during a balancing operation. Also, each weight 47 can be provided with a lug (not shown for disposition in slot 45 to restrain against rotation. The transverse slots 46 in the edges of the blade 12 are sized to mate with the upstanding portions of the blade holders 28 in the axle 17 so as to align the blade 12 below the drive rod 39 of the drive mechanism 32. However, the slots 46 can be omitted so that the blade holders 28 would abut the sides of the blade. The blade 12 also has a pair of cutting attachments 52 secured to the ends, for example, as disclosed in my copending application Ser. No. 579,055 filed Sept. 13, 1966.

Referring to FIGS. 3, 4 and 5, in order to balance a blade 12 on the balancing device 11, the platform 13 is leveled according to the reading of the spirit level 31. Should the platform 13 not be level, the rod 26 is threaded through the axle 17 in the opposite direction from the unbalance until the platform 13 becomes level. Thereafter, the drive mechanism 32 of the device is lifted by loosening bolt 34 in order to allow sufficient clearance for the blade 12 to pass beneath the depending arms 40. The blade 12 is then passed beneath the arms 40 and laid on the blade platform 19 with the aperture 30 of the blade 12 seated about the adapter 29. The blade holders 28 are then slid into the transverse slots 46 of the blade 12 to accommodate the width of the blade 12 and to lock the blade 12 into alignment with the drive rod 39. Next, the depending arms 40 are individually moved into the slots 41 in the weights 47 as by rocking of the blade 12. Should the arms 40 not be in the same plane of the slots 51, each arm 40 is rotated about the drive rod 39 while the rod 39 is held aginst rotation so as to move the position of the arm 40 laterally of the slots 51, the bolt is loosened to permit sliding of the guide box 37 into vertical alignment with the axis of the rod 22 between the blade holders 28. Upon achieving such alignment, the bolt 38 is re-tightened to lock the guide box 37 in place. Should the blade 12 be unbalanced, each of the bolts 49 are loosened to permit sliding of the weights 47 in unison with respect to the blade 12. Therein, the drive rod 39 is rotated through the facility of the thimble 43 in order to move the arms 40 along the drive rod 39 in the direction opposite the unbalance of the blade 12. The movement of the arms 40 consequently causes the weights 47 to slide on the blade 12 in the same direction so as to balance the blade weight about the axis of aperture 30. The balanced condition of the blade 12 is indicated by the spirit level 31. The bolts 47 are then re-tightened and the blade 12 is removed from the device 10 after lifting of the drive mechanism 32 as described above. The blade 12 can then be turned 180° and again balanced on the balancing device as a cross check.

Referring to FIG 6, instead of using a depending weight which requires vertical bore in the axle of the platform, the axle 17' can be elongated vertically and provided with a pair of horizontal threaded bores to receive a pair of threaded rods 60. In this embodiment, the rods 60 each have a pair of weights 61 threaded onto the ends in order to provide a compound leverage. In order to balance the axle 17', only one weight 61 need be threaded along a rod 60 until the axle becomes level. This embodiment cooperates with the remaining structure of the balancing device as described above and primed reference characters have been used to indicate like parts.

Referring finally to FIG. 7, instead of using a drive mechanism as described previously, a manual drive mechanism can be used which consists of a bar 70 having a pair of spaced depending arms 71 at the ends. The spacing of the arms 71 is such as to permit the arms 71 to fit within the slots of a pair of slidable weights on a blade as described above. In order to balance a blade, the blade is placed on the blade platform and any degree of unbalance is noted. The arms 71 of the bar 70 are then placed in the weights on the blade and moved manually in the opposite direction from the unbalance. The bar 70 is then removed and the degree of blade unbalance, if any, is again noted. Repeated movements of the weights are then carried out until the blade becomes balanced.

The invention provides a system wherein a lawn mower blade is balanced in an accurate rapid manner. The balanced blades affect a reduction in vibration when in use in a lawn mower and also reduces the wear on the bearings mounting the blade. The balancing device of the system avoids the need to remove material from the balancing blades which have become warped in the The balancing device of the invention is capable of balancing blades which have become warped in the center area due, for example, to punching of the central aperture or to inherent warpage.

It is noted that the drive rod of the driving mechanism can be shortened by using arms which are bent outward and then downward. It is also noted that the weights secured on the axle can be disposed in both a dependent vertical manner and a horizontal manner for purposes of compound leverage.

It is finally noted that the system need only utilizing device furnishes a flat stable surface for alignment of the axle and bearings. The mounting bracket is further adapted to be secured on a suitable work bench or table.

It is finally noted that the system need only utilize one weight on the blade and one matching depending arm on the driving mechanism in order to balance the blade.

Having thus described the invention, it is not intended that it be so limited as changes may be readily made therein without departure from the scope of the invention. Accordingly, it is intended that the subject matter described above and shown in the drawings be interpreted as illustrative and not in a limiting sense.

What is claimed is:

1. A balancing device for a blade having at least one weight slidably mounted thereon comprising a pivotally mounted platform for receiving the blade in transverse relation thereon;

a drive mechanism mounted over said platform in transverse relation thereto, said drive mechanism including at least one depending arm for engaging with the weight in the blade and means for moving said arm transversely of said platform to move the weight longitudinally of the blade to level said platform; and means on said platform for indicating the level of said platform.

2. A balancing device as set forth in claim 1 wherein said platform includes a pivotally mounted axle and a blade platform mounted on said axle to elevate and support a blade over said axle.

3. A balancing device as set forth in claim 2 wherein said means for moving said arm includes a guide box disposed over said blade platform and a drive rod rotatably mounted in said box, said drive rod having a threaded portion at one end mounting said arm thereon in threaded engagement, said drive rod being disposed transversely of said axle.

4. A balancing device as set forth in claim 2 further comprising a weight secured to said axle in dependent manner and a threaded rod threadably secured transversely in said axle in horizontal relation for adjusting the balance of said axle.

5. A balancing device as set forth in claim 2 further comprising a pair of rods secured transversely in said axle and a plurality of weights, each of said weights being movably secured to an end of one of said rods for leveling said axle.

6. A balancing device as set forth in claim 2 further comprising a pair of upstanding brackets, said axle being journalled in said brackets.

7. A balancing device as set forth in claim 6 wherein said drive mechanism is adjustably mounted on one of said brackets over said blade platform in independent relation thereto.

8. A balancing device as set forth in claim 2 which further comprises a pair of blade holders slidably mounted in said axle on opposite sides of said blade platform for locking a blade in place.

9. A balancing device as set forth in claim 1 further comprising blade holder means on said platform for locking a blade thereon for pivoting therewith.

10. A balancing device for a blade having at least one weight slidably mounted thereon comprising a pair of spaced upstanding brackets;

an axle journalled in said brackets for free rotation therein;

a blade platform mounted on said axle to elevate and support the blade over said axle;

a drive mechanism mounted over said blade platform including a guide box disposed in alignment with said blade platform, a rod rotatably mounted in said guide box in transverse relation to said axle, and a pair of depending arms threadably mounted on said rod at respective ends thereof for engaging with the weight in the blade whereby upon rotation of said rod the weight is moved longitudinally of the blade to level said platform; and means mounted on said axle for indicating the level of said axle.

11. A balancing device as set forth in claim 10 wherein said guide box is mounted on one of said brackets.

12. A balancing device as set forth in claim 10 wherein said means is a spirit level.

13. A balancing device as set forth in claim 10 wherein said blade platform includes means for holding a blade in place thereon.

14. A balancing system for balancing mower blades comprising a blade having at least one weight slidably mounted thereon;

a balancing device having a pivotally mounted platform thereon for supporting said blade thereon for rotation therewith and means for indicating the level of said platform; and a drive mechanism having at least one depending arm in engagement with said weight for moving said weight longitudinally of said blade to level said platform.

15. A blancing system as set forth in claim 14 wherein said blade has a pair of weights slidably mounted thereon, each of said weights having a slot therein, and said drive mechanism has a pair of depending arms, each of said arms being received in a slot of said weights.

16. A balancing system as set forth in claim 14 wherein said driving mechanism includes a guide box mounted over said platform and a rod rotatably mounted in said guide box transversely of said axle and in alignment with said blade, said rod being threaded at opposite ends and threadably receiving an arm at each end thereof whereby upon rotation of said rod, said arms move with respect to said rod and cause said weights to move in unison along said blade.

17. A balancing device as set forth in claim 16 wherein said platform includes a pivotally mounted axle transverse to said blade and a blade platform supported on said axle to elevate and support said blade above said axle.

18. A lawn mower blade comprising an elongated bar having a pair of cutting ends at opposite ends thereof, said bar having a central aperture therein, a pair of longitudinal slots centrally thereof and a pair of transverse slots in the edges thereof, and a pair of weights, each of said weights being slidably mounted over each of said longitudinal slots.

19. A lawn mower blade as set forth in claim 18 further comprising means locking said weights over said longitudinal slots, said means being adjustable to permit sliding of said weights along said bar.

References Cited

UNITED STATES PATENTS

| 3,039,313 | 6/1962 | Smith | 73—483 |
| 2,738,680 | 3/1956 | Bejeuhr | 73—480 |
| 2,339,624 | 1/1944 | Davis | 170—177 |

JAMES J. GILL, Primary Examiner

J. WHALEN, Assistant Examiner

U.S. Cl. X.R.

56—295; 73—487, 458; 170—159